United States Patent
Zou et al.

(10) Patent No.: US 9,836,426 B2
(45) Date of Patent: Dec. 5, 2017

(54) SD CARD BASED RTU

(71) Applicant: Honeywell International, Inc., Morristown, NJ (US)

(72) Inventors: Ke Zou, Shanghai (CN); Haifeng Liang, Shanghai (CN); Zhi Yang, Shanghai (CN); Jie Lv, Shanghai (CN); Enkui Lv, Shanghai (CN); Huagang Xu, Shanghai (CN); Changqiu Wang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/818,183

(22) Filed: Aug. 4, 2015

(65) Prior Publication Data
US 2017/0039159 A1 Feb. 9, 2017

(51) Int. Cl.
*G06F 9/44* (2006.01)
*G06F 13/40* (2006.01)
*G06F 21/62* (2013.01)
*G06F 9/445* (2006.01)

(52) U.S. Cl.
CPC .......... *G06F 13/4081* (2013.01); *G06F 8/665* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 5,095,417 | A | 3/1992 | Hagiwara et al. |
| 5,357,517 | A | 10/1994 | Takebe |
| 7,555,004 | B2 | 6/2009 | Orlik et al. |
| 7,969,300 | B2 | 6/2011 | Coronel et al. |
| 8,072,098 | B2 | 12/2011 | Elias et al. |
| 8,239,046 | B2 | 8/2012 | Koehler |
| 8,315,263 | B2 | 11/2012 | Enns et al. |
| 8,352,049 | B2 | 1/2013 | Hsiung et al. |

(Continued)

FOREIGN PATENT DOCUMENTS

| | | |
|---|---|---|
| JP | 2007527073 | 9/2007 |
| JP | 4990755 B2 | 8/2012 |

(Continued)

OTHER PUBLICATIONS

International Search Report and Written Opinion dated Oct. 27, 2015 in connection with PCT/US2015/043607; 12 pages.

(Continued)

*Primary Examiner* — Qamrun Nahar

(57) ABSTRACT

A system includes a remote terminal unit (RTU) and a portable storage medium (PSM), such as a secure digital (SD) card. The RTU includes processing circuitry. The RTU includes a portable storage interface configured to physically connect to the PSM and electrically couple the PSM to the processing circuitry. The RTU includes on-chip memory. The processing circuitry is configured to determine that the PSM is coupled to the processing circuitry and access a specified folder of the PSM. The processing circuitry is configured to: in response to determining that the PSM stores function code in the specified folder, perform a specified function corresponding to the function code by executing the function code.

20 Claims, 6 Drawing Sheets

(56) References Cited

U.S. PATENT DOCUMENTS

| | | | |
|---|---|---|---|
| 8,392,626 | B2 | 3/2013 | Wormmeester et al. |
| 8,583,067 | B2 | 11/2013 | Budampatl et al. |
| 8,656,065 | B1 | 2/2014 | Gerhart et al. |
| 8,667,091 | B2 | 3/2014 | Almadi et al. |
| 8,868,907 | B2 | 10/2014 | Graham et al. |
| 9,021,255 | B1 | 4/2015 | Aharoni et al. |
| 9,379,972 | B2 | 6/2016 | Enns |
| 2002/0147503 | A1 | 10/2002 | Osburn, III |
| 2003/0151513 | A1 | 8/2003 | Herrmann et al. |
| 2004/0259533 | A1 | 12/2004 | Nixon et al. |
| 2005/0174964 | A1 | 8/2005 | Orlik et al. |
| 2005/0216107 | A1 | 9/2005 | O'Donnell |
| 2005/0243867 | A1 | 11/2005 | Petite |
| 2005/0273205 | A1 | 12/2005 | Nickerson et al. |
| 2006/0202728 | A1 | 9/2006 | Wich |
| 2006/0240818 | A1 | 10/2006 | McCoy et al. |
| 2007/0280144 | A1 | 12/2007 | Hodson et al. |
| 2008/0077336 | A1 | 3/2008 | Fernandes |
| 2008/0080395 | A1 | 4/2008 | Law |
| 2008/0316979 | A1* | 12/2008 | Laroia ............. H04L 61/2015 370/338 |
| 2009/0201150 | A1 | 8/2009 | Becker |
| 2009/0224906 | A1 | 9/2009 | Balgard |
| 2009/0271558 | A1 | 10/2009 | Wormmeester et al. |
| 2009/0316628 | A1 | 12/2009 | Enns et al. |
| 2010/0079007 | A1 | 4/2010 | Elias |
| 2011/0110291 | A1 | 5/2011 | Ishii |
| 2011/0246791 | A1 | 10/2011 | Kambayashi |
| 2011/0276607 | A1 | 11/2011 | Suma et al. |
| 2012/0041574 | A1 | 2/2012 | Hsiung et al. |
| 2012/0063330 | A1 | 3/2012 | Mori |
| 2012/0078869 | A1 | 3/2012 | Bellville et al. |
| 2012/0084400 | A1 | 4/2012 | Almadi et al. |
| 2012/0151588 | A1 | 6/2012 | Wang et al. |
| 2012/0230446 | A1 | 9/2012 | Feng |
| 2012/0236768 | A1 | 9/2012 | Kolavennu et al. |
| 2012/0290735 | A1 | 11/2012 | Johnson et al. |
| 2013/0076765 | A1* | 3/2013 | Nam ................. G06T 1/00 345/522 |
| 2013/0110998 | A1 | 5/2013 | Zrelli |
| 2013/0151849 | A1 | 6/2013 | Graham et al. |
| 2013/0173840 | A1 | 7/2013 | Calvin et al. |
| 2013/0246801 | A1 | 9/2013 | Takahashi |
| 2013/0262064 | A1 | 10/2013 | Mazzaro |
| 2013/0275956 | A1* | 10/2013 | Lai ................. G06F 8/65 717/170 |
| 2013/0307699 | A1 | 11/2013 | Brekke et al. |
| 2014/0119290 | A1 | 5/2014 | Grewal |
| 2014/0232555 | A1 | 8/2014 | Aakvaag |
| 2015/0058480 | A1 | 2/2015 | Allgaier |
| 2015/0084747 | A1 | 3/2015 | McLaughlin et al. |
| 2015/0278144 | A1 | 10/2015 | McLaughlin et al. |
| 2015/0304193 | A1 | 10/2015 | Ishii |
| 2016/0048474 | A1 | 2/2016 | Lv et al. |

FOREIGN PATENT DOCUMENTS

| | | |
|---|---|---|
| JP | 2013535730 A | 9/2013 |
| KR | 20100066815 A | 6/2010 |
| KR | 20120135142 A | 12/2012 |
| WO | 2005086110 A2 | 9/2005 |
| WO | 2012012723 | 1/2012 |
| WO | 2014197182 A1 | 12/2014 |
| WO | 2015047744 A1 | 4/2015 |

OTHER PUBLICATIONS

"25A Right Angle Signal/Power Combo"; SAMTEC Power Strip 25; 2008; 1 page.

"FCN-RTU Low Power Autonomous Controller Hardware"; STARDOM FCN-RTU; Yokogawa Electric Corporation; Dec. 2008; 13 pages.

"ControlWave Micro Process Automation Controller"; Instruction Manual; Emerson Process Management; Jun. 2013; 170 pages.

U.S. Patent Application "Remote Terminal Unit (RTU) Hardware Architecture" U.S. Appl. No. 14/459,557, filed Aug. 14, 2014; 36 pages.

U.S. Office Action issued for U.S. Appl. No. 13/908,977 dated Jan. 29, 2016 14 pages.

International Search Report dated Oct. 10, 2014 in connection with International Application No. PCT/US2014/038208; 3 pages.

Written Opinion of the International Searching Authority dated Oct. 10, 2014 in connection with International Application No. PCT/US2014/038208; 5 pages.

International Search Report dated Dec. 11, 2014 in connection with International Application No. PCT/US2014/055307; 4 pages.

Written Opinion of the International Searching Authority dated Dec. 11, 2014 in connection with International Application No. PCT/US2014/055307; 7 pages.

European Search Report dated Sep. 22, 2014 in connection with European Patent Application No. 14164273.6; 3 pages.

Non-Final Office Action dated Dec. 22, 2014 in connection with U.S. Appl. No. 13/908,977; 12 pages.

Final Office Action dated Jun. 10, 2015 in connection with U.S. Appl. No. 13/908,977; 13 pages.

Notification of Transmittal of the International Search Report and the Written Opinion of the International Searching Authority, or the Declaration dated Jun. 10, 2015 in connection with International Patent Application No. PCT/US2015/019671, 12 pages.

Office Action dated Aug. 2, 2016 in connection with U.S. Appl. No. 14/228,142, 18 pages.

Paul F. McLaughlin, et al., "Remote Terminal Unit (RTU) With Wireless Diversity and Relatedmethod", U.S. Appl. No. 14/459,557, 33 pages, filed Aug. 14, 2014.

Office Action dated Jul. 14, 2016 in connection with U.S. Appl. No. 14/035,557, 16 pages.

Zhen Wang, et al., Method and Apparatus for Determining Displacement of a Remote Terminal Unit (RTU), U.S. Appl. No. 14/742,516, 24 pages, filed Jun. 17, 2015.

Paul F. McLaughlin, et al., "Remote Terminal Unit (RTU) With Universal Input/Output (UIO) and Related Method", U.S. Appl. No. 14/228,142, 53 pages, filed Mar. 27, 2014.

* cited by examiner

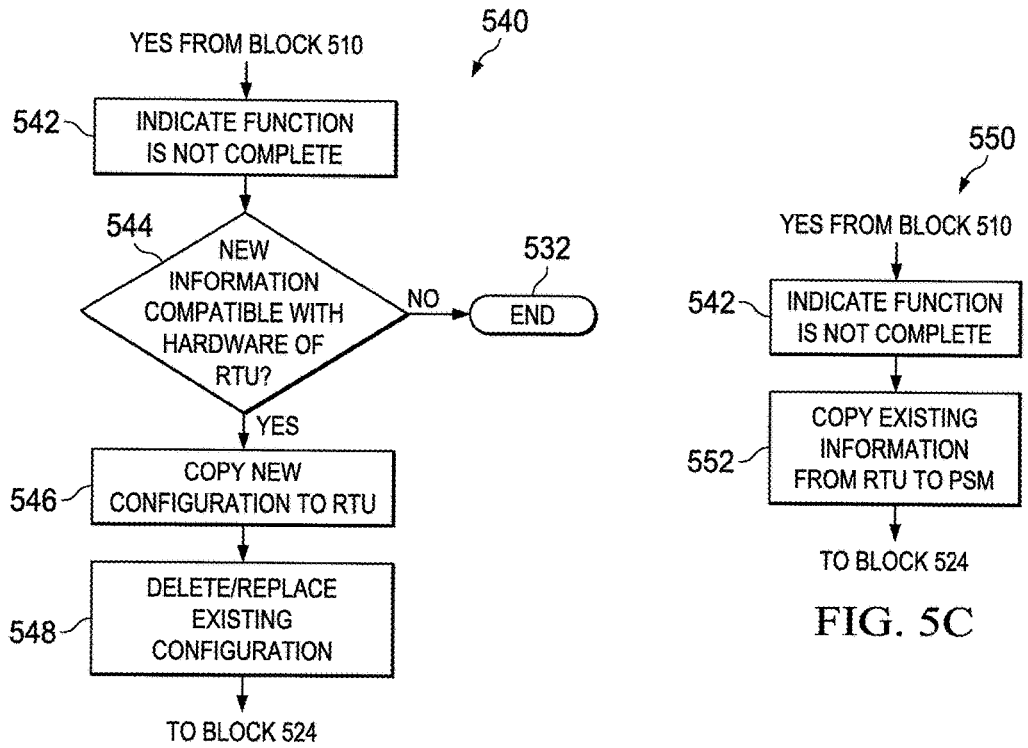
FIG. 5B
FIG. 5C
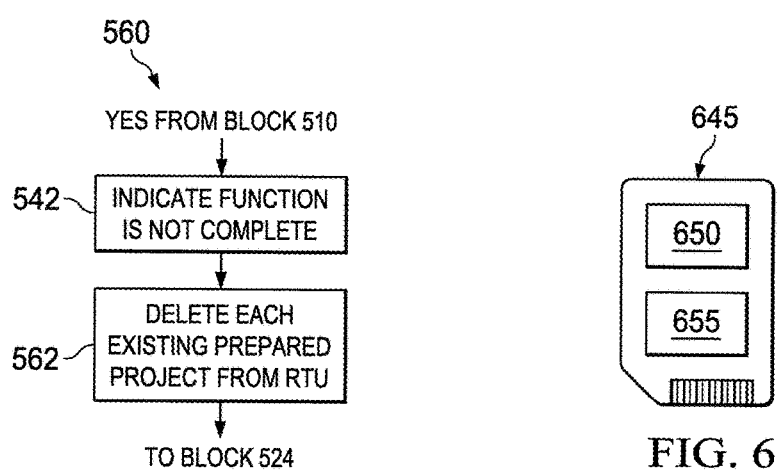
FIG. 5D
FIG. 6

SD CARD BASED RTU

TECHNICAL FIELD

This disclosure is generally directed to industrial process control and automation systems. More specifically, this disclosure is directed to a system and method for operating a portable storage unit based remote terminal unit (RTU) or secure digital (SD) card based RTU.

BACKGROUND

An RTU represents a device or system that provides localized control and data access at a site that is remote from a supervisory control and data acquisition (SCADA) system or other automation system. For example, multiple RTUs can be used at different sites and for different purposes in an oil and gas field. The RTUs can collect data, perform local control, record historical values using sensors and actuators at different sites (such as wells, pipelines, and compression stations), and provide live and historical data to an automation system. The automation system can execute control logic and alter the operations of actuators at the different sites via the RTUs. The RTUs themselves could also incorporate algorithms for data analytics.

In general, RTUs have increased in usage and complexity from their early designs in the 1970s. Today, RTUs often need to reliably support a large set of application-specific network capabilities and protocols, as well as support a number of control execution models and provide smart device integration.

SUMMARY

This disclosure provides a system and method for operating a portable storage unit based remote terminal unit (RTU) or SD card based RTU.

In a first example, a method includes determining, by processing circuitry of a remote terminal unit (RTU), that a portable storage medium (PSM) is coupled to the processing circuitry. The method also includes, in response to determining that the PSM stores function code in a specified folder that the processing circuitry is configured to access, performing a specified function corresponding to the function code by executing the function code. The RTU includes a slot configured to physically receive the PSM. The slot is configured to electrically couple the PSM to the processing circuitry. The RTU includes on-chip memory mounted on a same chip as the processing circuitry.

In a second example, a system includes a remote terminal unit (RTU). The RTU includes processing circuitry. The RTU includes a portable storage interface configured to physically connect to a portable storage medium (PSM). The portable storage interface is also configured to electrically couple the PSM to the processing circuitry. The RTU includes on-chip memory mounted on a same chip as the processing circuitry. The processing circuitry is configured to determine that the PSM is coupled to the processing circuitry and access a specified folder of the PSM. The processing circuitry is also configured to, in response to determining that the PSM stores function code in the specified folder, perform a specified function corresponding to the function code by executing the function code.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 5A through 5D illustrate an example method according to this disclosure; and FIG. 6 illustrates a portable storage medium (PSM) according to this disclosure.

DETAILED DESCRIPTION

FIGS. 1 through 6, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
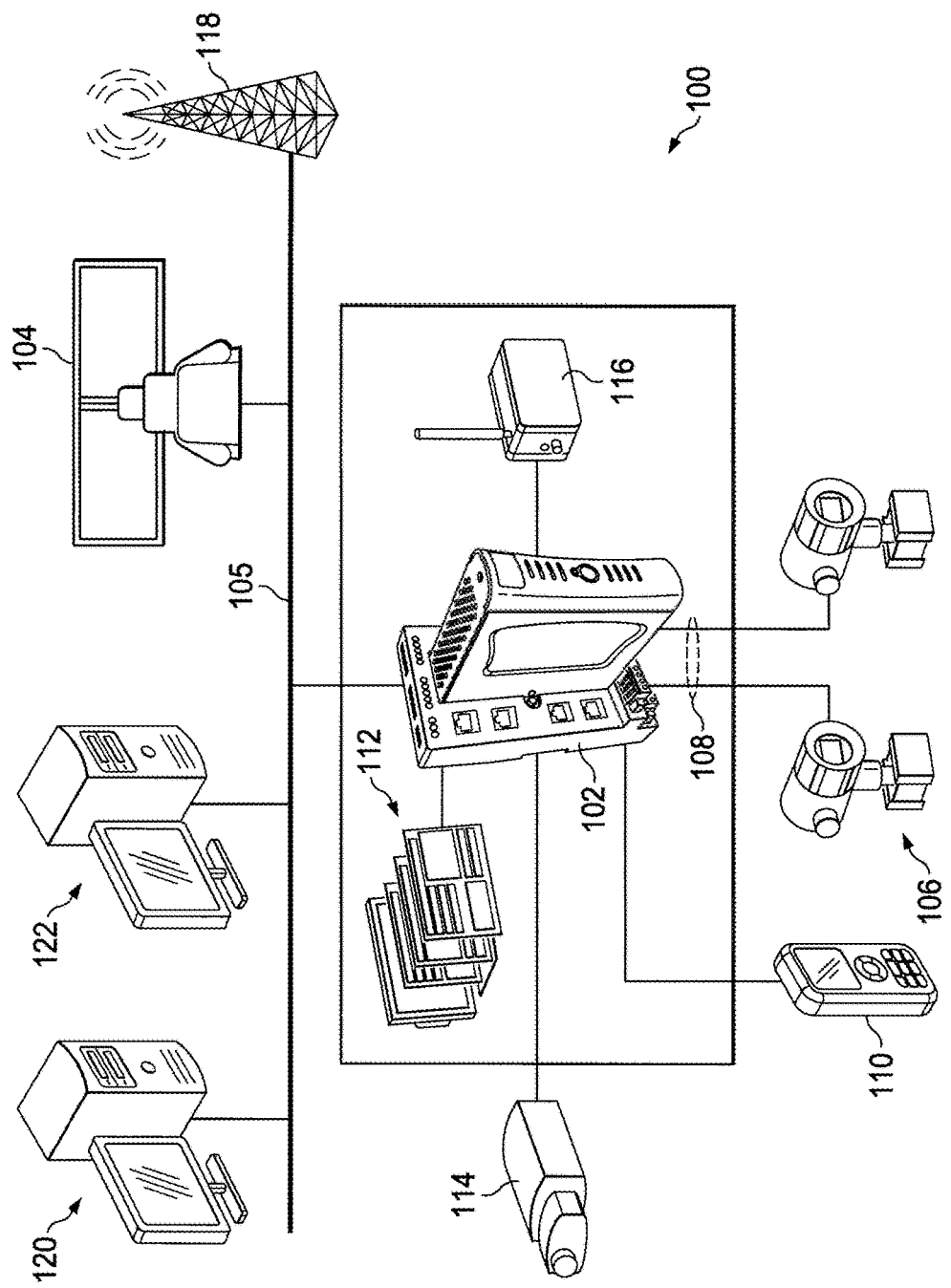
FIG. 1 illustrates an example industrial control and automation system having a remote terminal unit (RTU) according to this disclosure.

FIG. 1 illustrates an example industrial control and automation system 100 having an RTU 102 according to this disclosure. Note that the RTU 102 may also be referred to in the art as a remote telemetry unit. Also note that while a single RTU 102 is shown here, the system 100 could include any number of RTUs 102 distributed in one or more geographical areas.

The RTU 102 represents a device or system that provides localized control and data access at a site that is remote from a supervisory control and data acquisition (SCADA) system or other control system 104. For example, the RTU 102 could be positioned at or near an oil, gas, or water well or power substation. In these or other situations, the RTU 102 can be used to collect data from local sensors and process the data to generate control signals for local actuators. The RTU 102 can also interact with the control system 104 as needed. In this way, process control and automation functions can be provided at locations remote from the control system 104. The control system 104 is shown as communicating with the RTU 102 over a wired network 105 and using wireless connections, such as via microwave, cellular, or other radio frequency (RF) communications. However, the RTU 102 could communicate with the control system 104 over any suitable wired or wireless connection(s). In some embodiments, the components 102-104 could ordinarily communicate using a wired connection, with wireless communications used as backup.

The RTU 102 also communicates and interacts with one or more industrial field devices 106. The field devices 106 could include sensors that measure one or more characteristics of a process, actuators that alter one or more characteristics of a process, or other industrial field devices. In this example, the RTU 102 uses wired connections 108 to communicate with the field devices 106. The wired connections 108 could include serial connections (such as RS232 or RS485 connections), Ethernet connections, industrial protocol connections, or other wired connections. Note, however, that the RTU 102 could also communicate wirelessly with one or more field devices 106.

The RTU 102 in this example also communicates and interacts with at least one local user device 110. The user device 110 could be used by personnel to interact with the RTU 102 or with the field devices 106 or the control system 104 communicating with the RTU 102. The user device 110 includes any suitable structure supporting user interaction with an RTU.

Various other components could optionally be used with the RTU 102. For example, the RTU 102 could interact with one or more human-machine interfaces (HMIs) 112, such as display screens or operator consoles. The HMIs 112 can be used to receive data from or provide data to the RTU 102. One or more security cameras 114 (such as Internet Protocol cameras) could be used to capture still or video images and to provide the images to a remote location (such as a security center) via the RTU 102. A wireless radio 116 could be used to support wireless communications between the RTU 102 and a remote access point 118, which communicates with the control system 104 or other remote systems via the network 105. The other remote systems can include a field device manager (FDM) 120 or other asset manager and/or an RTU builder 122. The FDM 120 can be used to configure and manage assets such as field devices (including the field devices 106), and the RTU builder 122 can be used to configure and manage RTUs (including the RTU 102).

The RTU 102 has the ability to support a flexible mix of input/output (I/O) channel types. For example, the channel types can include analog inputs (AIs), analog outputs (AOs), digital inputs (DIs), digital outputs (DOs), and pulse accumulator inputs (PIs). The AIs and AOs may or may not support digital communications, such as digital communications over 4-20 mA connections compliant with the HIGHWAY ADDRESSABLE REMOTE TRANSDUCER (HART) protocol. Some RTUs 102 can achieve a desired mix of I/O channel types using I/O cards that have a fixed number of inputs and outputs, where each input or output is fixed to a particular type. Other RTUs 102 can achieve a desired mix of I/O channel types using I/O cards with reconfigurable inputs or outputs. Moreover, some RTUs 102 can be expandable so that one or more I/O modules (each with one or more I/O channels) can be used with the RTUs 102.

In particular embodiments, the RTU 102 can have one, some, or all of the following features that are summarized in Table 1 (below). Each of these features is described more particularly below. Table 1 also shows differences between the RTU 102 of this disclosure and other RTUs without an SD card basis.

TABLE 1

| | SD Card Based RTU Features | SD Card Based RTU | Non-SD RTUs |
|---|---|---|---|
| 1 | History data storage | Large-scale & fast speed & data accessible when RTU broken | Small-scale & slow speed & data not accessible when RTU broken |
| 2 | Easy firmware upgrade without using software tools & fix it when RTU firmware image corrupted and could not boot up | Yes | No |
| 3 | Prepared project download without using software tools | Yes | No |
| 4 | Project export without using software tools | Yes | No |
| 5 | Factory reset without using software tools | Yes | No |
| 6 | System event logs export without using; software tools | Yes | No |

First, the RTU 102 can store history data for a long period of time, so that the historical data (e.g., system data logs) can be read back later for analysis. Even if the RTU processing circuitry or firmware gets corrupted, the historical data is kept safe and remains machine-readable by being stored on a portable storage medium (PSM), such as a pluggable SD card.

By way of comparison, a non-SD card based RTU (hereinafter "non-SD RTU") is associated with problems that are solved by the embodiments of this disclosure. The on-chip flash memory size limitation renders non-SD RTUs incapable of storing large-scale history data at high enough resolution (namely, data recorded at a fast enough speed, such as every 1 second or every 100 milliseconds) for a long period of time (e.g., 3 months). Moreover, the history data stored in on-chip memory can only be read back through a specified software tool. If the non-SD RTU has broken hardware or corrupted software, the historical data would no longer be accessible, or would be otherwise lost. The on-chip memory size is generally limited to less than 128 megabytes (MB), yet the size of an SD card of industrial standard can be much larger (e.g., 2 GB or 64 GB). The SD card enables the RTU 102 to store or log a larger capacity of history data collected at a faster rate for a long period of time. Accordingly, engineers can obtain more measurements and more variables of history with more refined resolution, which enables root-cause analyzers to perform new or more precise analyses and more accurately resolve complicated situations.

Second, the RTU 102 can perform a firmware upgrade conveniently without involving any extra software tools and without involving a computer. That is, the RTU processing circuitry can receive new firmware without connecting to a computer. The SD card based RTU 102 can boot up through firmware on an SD card and replace a corrupted firmware image with a new firmware image through the SD card. A project engineer does not have to operate a software tool in a computer and connect a cable to the RTU 102 to perform the firmware upgrade. Even if the firmware of the RTU 102 gets corrupted and is no longer able to boot up the RTU 102, the engineer no longer has to replace the whole RTU 102 with a new RTU. The engineer can simply store a new RTU firmware image in a SD card, and insert the SD card into the RTU SD card slot, then the RTU 102 automatically updates the firmware. In consideration of system security, only an authorized and specified SD card may be allowed to automatically operate with the RTU 102. In the case of large numbers of RTU firmware upgrades, the time saved can be significant.

By comparison, the non-SD RTUs only support firmware upgrade through a software tool, which requires a computer peripheral device or cable to interface the non-SD RTU to the computer. If the non-SD RTU firmware image becomes corrupted or cannot boot up, the non-SD RTUs would become unusable, requiring an engineer to replace the whole non-SD RTU.

Third, the RTU 102 can download a prepared project to the RTU on-chip memory without using any configuration software or computer, such as in an on-site (for example, in the field) location or at a time prior to in-field commissioning. For example, a project engineer can store a prepared project configuration in an SD card, then insert the SD card into the RTU 102, which is configured to automatically copy the prepared project to the RTU on-chip memory. In certain embodiments, the RTU 102 can automatically run or execute the prepared project only in the case of an authorized and specified SD card, for security considerations. This makes the project commissioning much easier and saves time. For example, in a wellhead project applying an RTU or RTUs, most of RTUs would share the same configuration, so bulk configuration is useful. By configuring the RTU 102 to automatically install a prepared project in response to the simple insertion of an SD card, users do not have to be trained on how to use specified configuration software to download the project to the RTU 102. Similarly, as another example, a crude oil pipeline project application of an RTU or RTUs, the configuration file includes an identification of sensor inputs/outputs, logic calculations associated with obtaining sensor measurements accurately, an identification of actuator inputs/outputs (such as actuator operation mode and status), and can include logic for generating system event logs in a way that easily transfers to a root cause analyzing machine.

By comparison, the process to install project configurations to a non-SD RTU must be connected to a computer with specified configuration software installed. Users must be trained on how to use specified configuration software to download the project to the non-SD RTU.

Fourth, the RTU 102 can export a copy of its project configuration from the RTU 102 without using any extra software tools and computer. This feature can be used to copy the current project configuration from the RTU 102 to be stored as a backup, used for project analysis, or used for configuring other SD card based RTUs 102. To copy the project configuration from the RTU 102 to an SD card, the user can simply plug in an SD card to the RTU, and wait while the RTU automatically copies the project to the inserted SD card (for example, an authorized and specified SD card in light of security concerns).

By comparison, the non-SD RTUs are incapable of exporting data from on-chip memory without using another computer loaded with specific interfacing software tools. An end user may possess hundreds of projects stored in his computer, and it may not be easy to find the correct project configuration out of the hundreds. Even if the user can find a project configuration suitable for a particular wellhead project, the found project configuration may not be the latest and most up-to-date configuration file.

Fifth, the RTU 102 can perform a factory reset on itself in a simple way. When a user wants to reset the RTU 102 to the factory status, the user can simply plug in an SD card specified for factory reset into the RTU 102, and the RTU 102 will automatically return back to the factory status (in consideration of the security, only authorized and specified SD card may be allowed to automatically instruct the processor of the RTU 102). To overcome a security threat, a wellhead project owner may prevent rogue users from resetting the RTU deliberately, e.g., by eliminating a small button on the RTU for conducting a factory reset.

In contrast, the non-SD RTUs require a user to download a new project to a clean RTU without worrying about any previous mis-configurations. The non-SD RTUs include a small button on the body of the RTU for conducting a factory reset in response to a mere button depress. That is, non-SD RTUs are susceptible to accidental or deliberate configuration losses.

Sixth, the RTU 102 can export system event logs without interfacing with a computer and extra software tools. To obtain a copy of the system event logs, the user can simply insert an SD card into the SD card slot of the RTU 102, and the RTU 102 can automatically export the system event logs to the inserted SD card (for example, for security protections, the RTU 102 can require the SD card to be authorized and specified). The system event logs include recordings of the RTU 102 running status (e.g., operation modes, faults, etc.) and are very important for any issue analysis (e.g., root cause or fault analysis). In contrast, the non-SD RTUs either do not store system logs or are incapable of exporting system logs without interfacing through a computer having a specified software tool. The user must operate a software tool on a computer and connect a cable to the non-SD RTU to obtain or export the system event logs from the on-chip memory or the non-SD RTU.

Although FIG. 1 illustrates one example of an industrial control and automation system 100 having an RTU 102, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while shown as being used with wired field devices, the RTU 102 could be used with only wireless field devices or with both wired and wireless field devices. In addition, FIG. 1 illustrates one example operational environment where an RTU 102 can be used. One or more RTUs could be used in any other suitable system.

Figure 2:
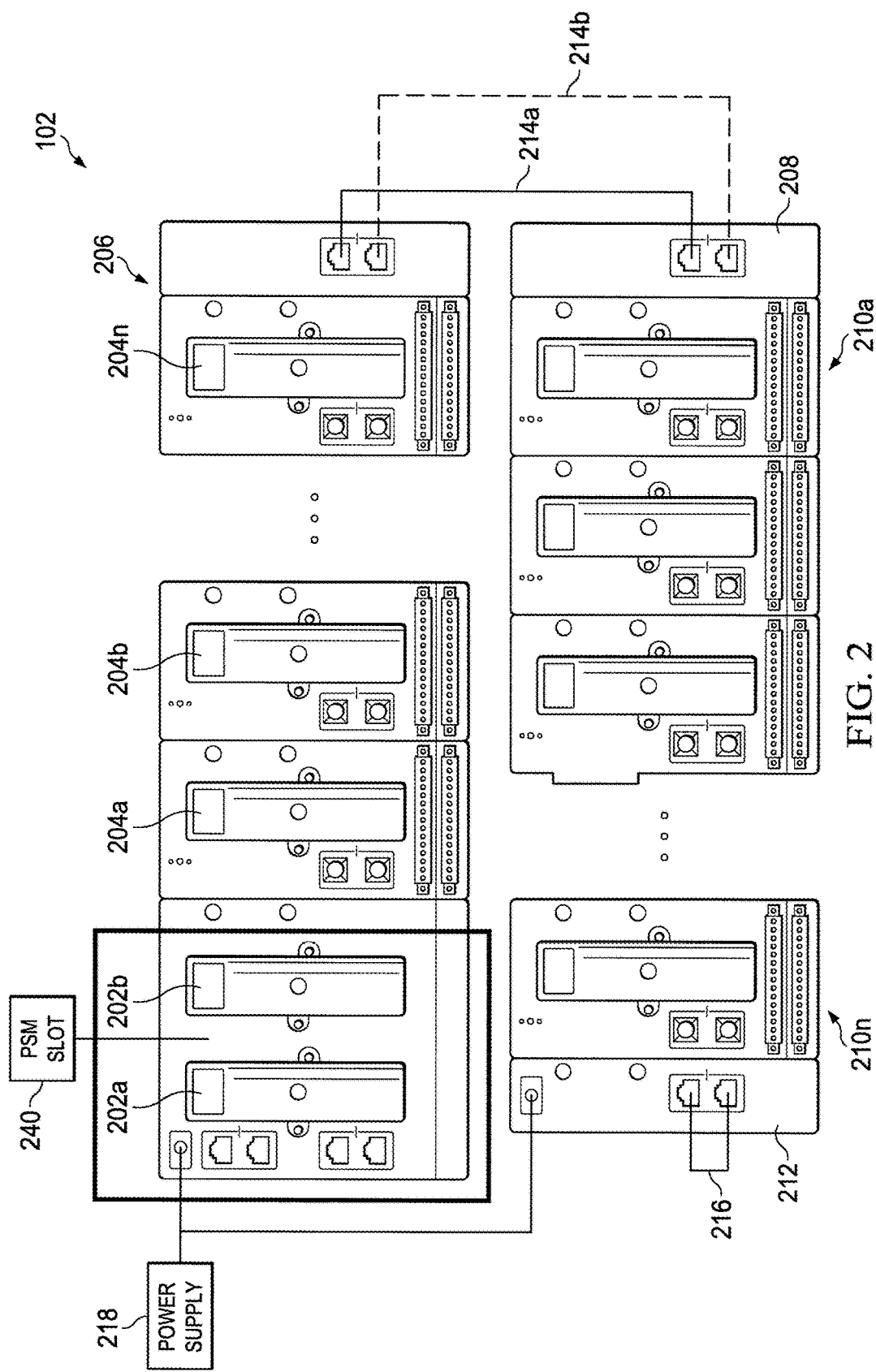
FIG. 2 through 4B illustrate details of example SD card based RTUs according to this disclosure.

FIG. 2 illustrates details of an example RTU 102 according to this disclosure. For ease of explanation, the RTU 102 is described as being used in the system 100 of FIG. 1. However, the RTU 102 could be used in any other suitable system.

FIG. 2 illustrates an example of the RTU 102 with redundant controller modules 202a-202b, a first set of I/O modules 204a-204n, an expansion board 206, and at least one portable storage slot 240. Each controller module 202a-202b represents a module that executes control logic and other functions of the RTU 102. For example, each controller module 202a-202b could execute control logic that analyzes sensor data and generates control signals for actuators. Each controller module 202a-202b could also execute functions that control the overall operation of the RTU 102, such as functions supporting communications with external devices or systems. Each controller module 202a-202b includes any suitable structure for controlling one or more operations of an RTU. In some embodiments, each controller module 202a-202b includes at least one processing device that executes a LINUX or other operating system.

The I/O modules 204a-204n support communications between the controller modules 202a-202b and external devices or systems (such as the field devices 106) via I/O channels of the I/O modules 204a-204n. Each I/O module 204a-204n includes circuitry supporting the use of one or more I/O channels. If an I/O module supports the use of one or more reconfigurable I/O channels, the I/O module 204a-204n also includes circuitry that configures at least one I/O channel as needed. The circuitry can be used to configure and reconfigure each I/O channel as desired. For instance, example types of reconfigurable I/O channels are shown in U.S. Pat. No. 8,072,098; U.S. Pat. No. 8,392,626; and U.S. Pat. No. 8,656,065 (all of which are hereby incorporated by reference in their entirety). Also, the use of reconfigurable I/O channels in an RTU is described in U.S. patent application Ser. No. 14/228,142 (which is hereby incorporated by reference in its entirety). The RTU 102 can include any number of I/O modules 204a-204n. In some embodiments, a specified number of I/O modules 204a-204n (such as eight modules) can be built into the RTU 102.

The expansion board 206 allows the RTU 102 to be coupled to an expansion board 208, which is coupled to a second set of I/O modules 210a-210n. The I/O modules 210a-210n could have the same or similar structure as the I/O modules 204a-204n, and any number of I/O modules 210a-210n could be used in the second set (such as eight modules). An expansion board 212 can be used to couple to a third set of I/O modules. Additional I/O modules can be added in a similar manner.

Each expansion board 206, 208, 212 includes any suitable structure facilitating the addition of one or more I/O modules to an RTU. In this example, two electrical paths 214a-214b are formed through the RTU 102, and the electrical paths 214a-214b meet at a loop 216. The electrical paths 214a-214b could be formed in any suitable manner, such as by using Ethernet connections and electrical paths through the I/O modules and expansion boards. The loop 216 can be used to indicate that no additional I/O modules are presently connected to the RTU 102. Note, however, that the loop 216 could also be placed on the expansion board 206 to indicate that no additional sets of I/O modules are currently connected to the RTU 102.

A power supply (PS) 218 provides operating power to the components of the RTU 102. The power supply 218 includes any suitable structure(s) configured to provide operating power to an RTU. For example, the power supply 218 could include one or more batteries, solar panels, fuel cells, or other source(s) of power.

In some embodiments, the controller modules 202a-202b are implemented using separate circuit boards. Communications between the redundant controller modules 202a-202b could occur via various communication interfaces of the circuit boards. If the redundant controller modules 202a-202b are present in the RTU 102 (which need not always be the case), the RTU 102 can automatically manage which redundant controller module has control of each I/O module and provide seamless switchover upon a failure of a controller module.

The portable storage slot 240 is configured to physically connect to a portable storage medium (PSM) (shown in FIG. 6 by the PSM 645), such as by receiving the PSM 645 into the slot 240. As an example, the PSM can be an SD card (e.g., a standard SD card, micro SI) card, mini SD card, or the like) or another suitable non-volatile memory device can be used in place of the SD card 645. In this example, the portable storage slot 240 can be an SD card slot or receptacle that is configured to receive the SD card and connect it with the circuitry of the RTU 102 and its associated controller module(s) 202a-202b. For ease of explanation, the PSM 645 and portable storage slot 240 are described in the context of being the SD card 645 and SD card slot 240, respectively. The SD card slot 240 provides a physical interface between the PSM 645 and the other components within the RTU 102, enabling the controller module(s) 202a-202b to read from and write to the PSM 645 through an electrical coupling (for example, an electrical connection).

Although FIG. 2 illustrates details of an example RTU 102, various changes may be made to FIG. 2. For example, the number(s) and type(s) of ports and interfaces shown in FIG. 2 are for illustration only. Also, the functional divisions of the RTU 102 shown in FIG. 2 are for illustration only. Various components in FIG. 2 could be omitted, combined, or further subdivided and additional components could be added according to particular needs.

Figure 3:
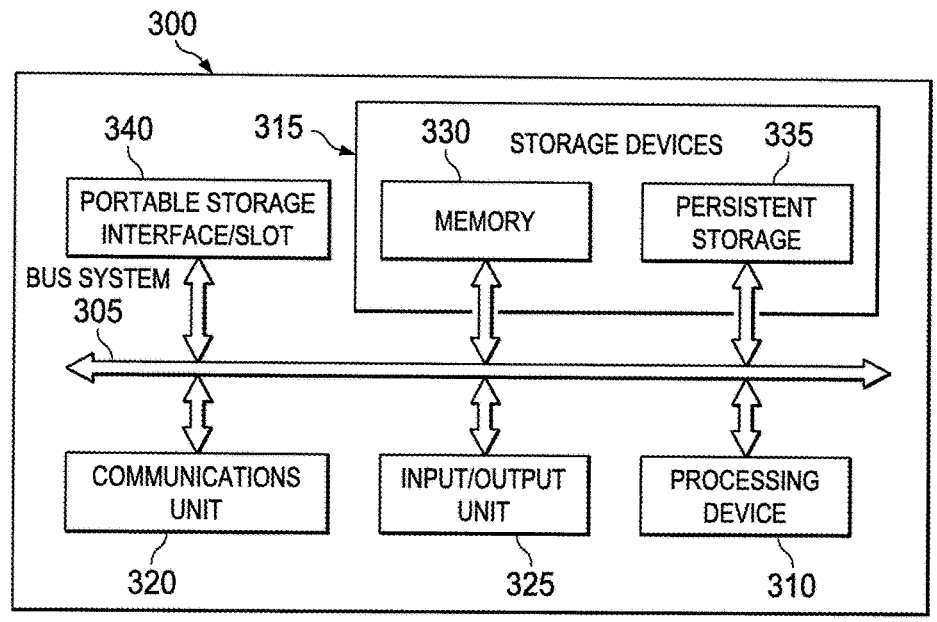

FIG. 3 illustrates an example device 300 supporting SD card based RTU systems and methods according to embodiments of this disclosure. The device 300 could, for example, represent the RTU 102 or other computing device supporting RTU serial communication mechanism. Accordingly, like the device 300, the RTU 102 can be referred to as an SD card based RTU.

As shown in FIG. 3, the device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc. The persistent storage 335 can be disposed on the same integrated circuit chip as the processing device 310, and is accordingly described as "on-chip memory."

In certain embodiments, the device 300 includes a portable storage slot 340, such as the portable storage slot described above with reference to FIG. 2. The portable storage slot 340 is configured to physically connect to a PSM 645, such as by receiving the PSM 645 into the slot 340. The SD card slot 340 provides a physical interface between the PSM 645 and the other components within the device 300, enabling the processing device 310 to read from and write to the PSM 645 through an electrical coupling (for example, an electrical connection).

The communications unit 320 supports communications with other systems or devices. For example, the communications unit 320 could include a network interface card or a wireless transceiver facilitating communications over the network 105. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

Although FIG. 3 illustrates one example of a device 300 supporting the SD card based RTU mechanism, various changes may be made to FIG. 3. For example, computing devices come in a wide variety of configurations. The device 300 shown in FIG. 3 is meant to illustrate one example type of computing device and does not limit this disclosure to a particular type of computing device.

Figure 4A:
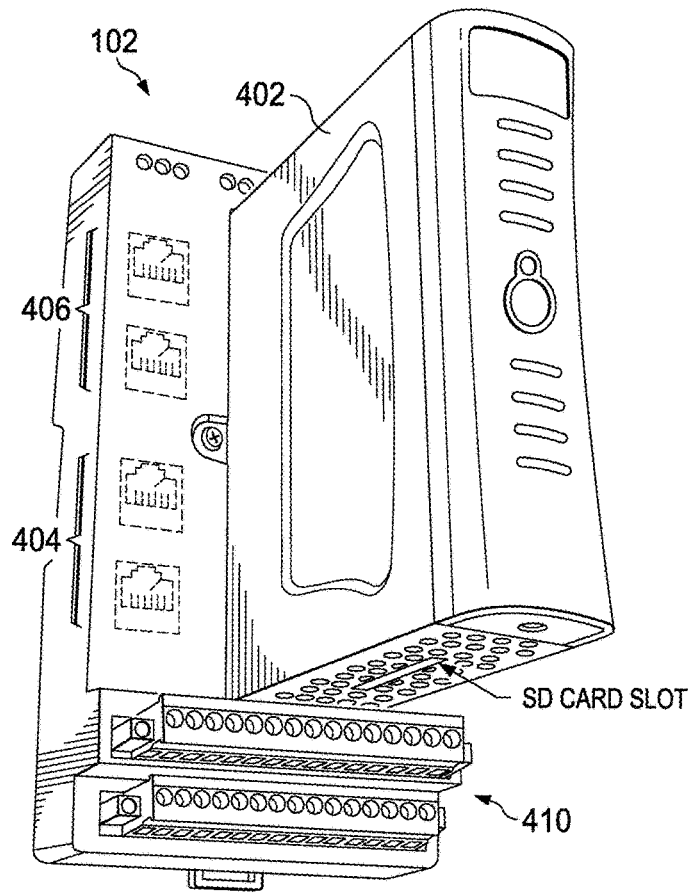
Figure 4B:
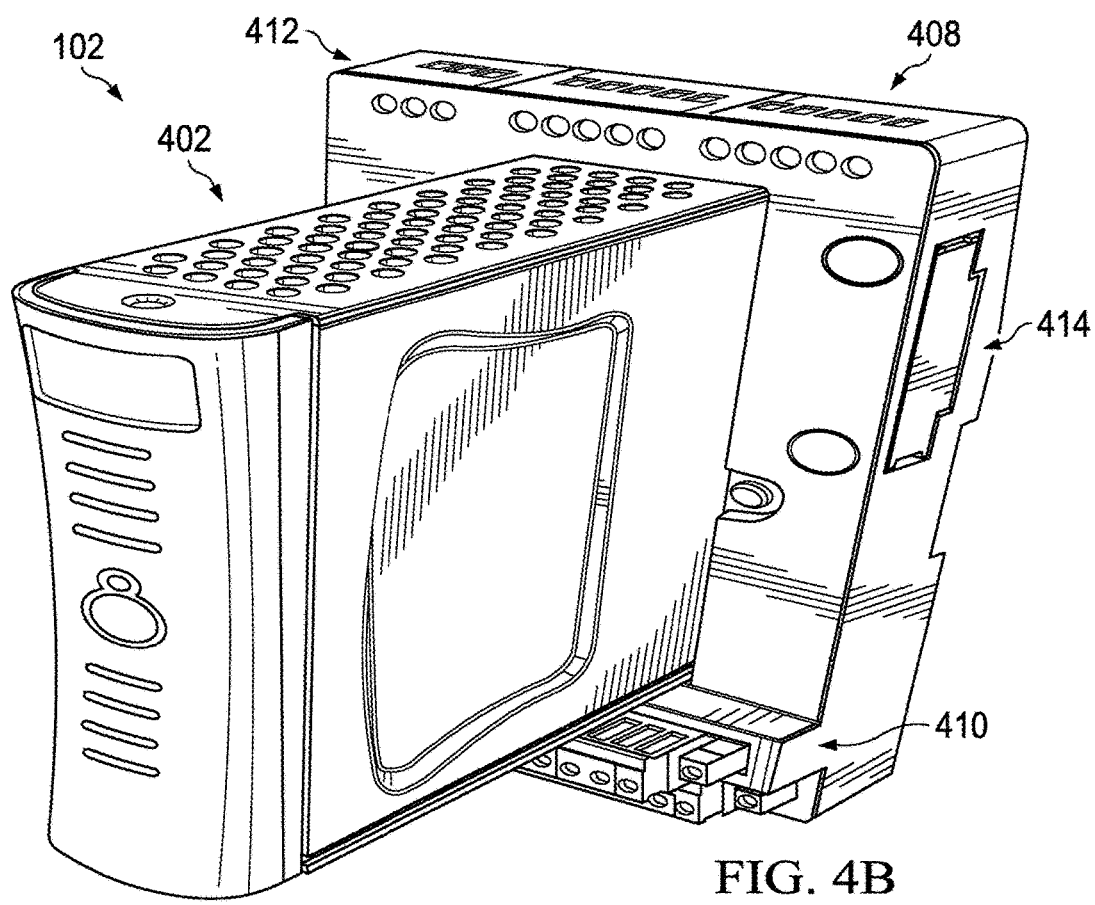
Figure 5A:
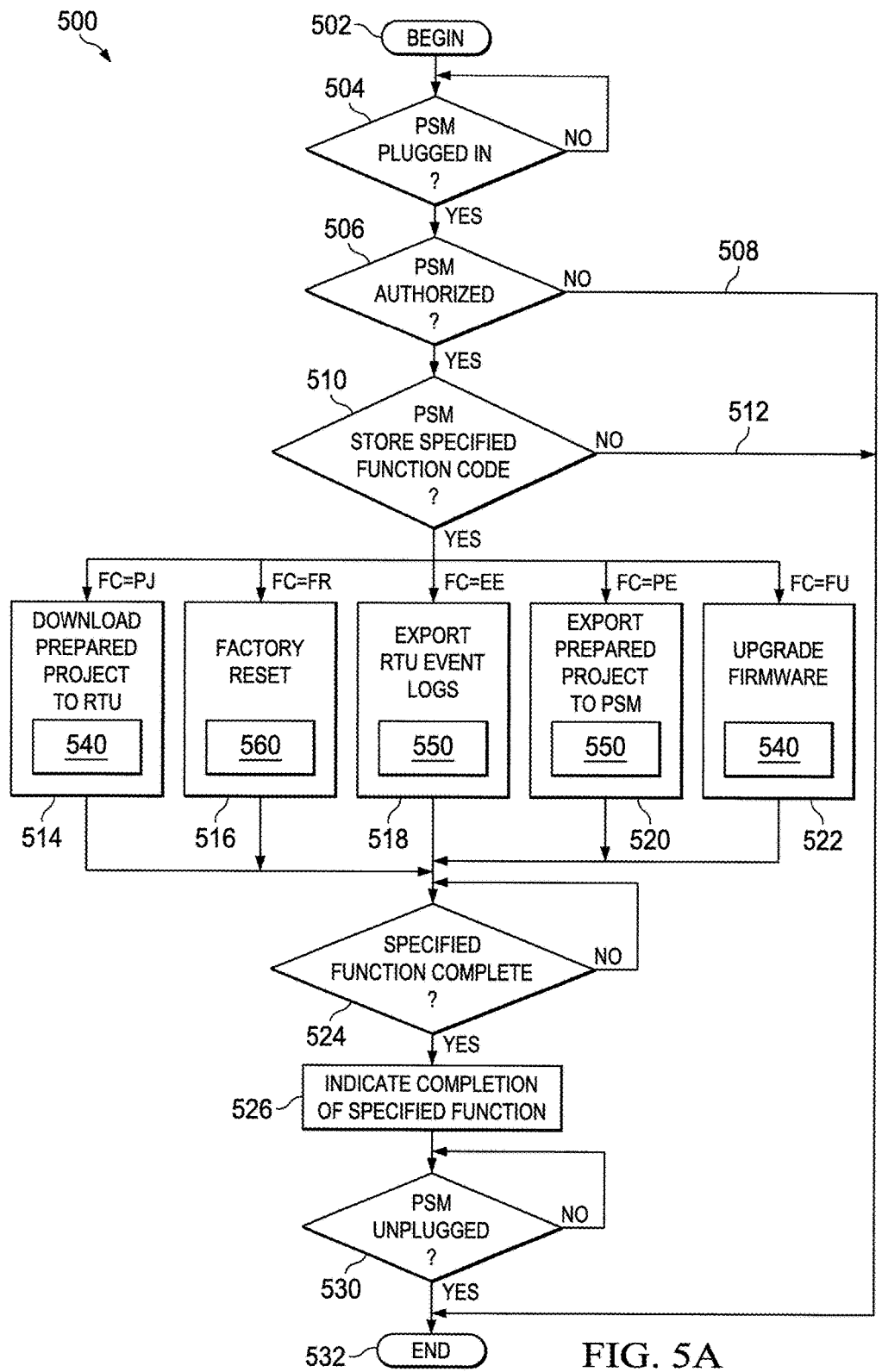

FIGS. 4A and 4B illustrate additional details regarding the example RTU 102. A housing 402 is used to encase and protect other components of the RTU 102. The housing 402 also provides access to various other components of the RTU 102, such as one or more ports or terminals. The housing 402 can have any suitable size, shape, and dimensions and be formed from any suitable material(s) (such as metal or ruggedized plastic).

The RTU 102 also includes two uplink/downlink ports 404, two RS232 ports 406, and two RS485 ports 408. The ports 404 can be used to couple the RTU 102 to higher-level or lower-level devices, such as the control system 104, FDM 120, or RTU builder 122 via the network 105. The ports 404 could represent any suitable structures for coupling to one or more communication links, such as Ethernet ports. The RS232 ports 406 and the RS485 ports 408 could be used to couple the RTU 102 to one or more field devices or other devices that use the RS232 or RS485 serial protocol.

Various I/O terminals 410 are also used to couple the RTU 102 to one or more field devices. The I/O terminals 410 here can be coupled to the I/O modules 204a-204n and thereby provide a communication path between the I/O modules 204a-204n and the field device(s) coupled to the I/O terminals 410. The I/O terminals 410 can be coupled to various types of field devices, and the I/O modules 204a-204n can be configured appropriately as AI (with or without digital communication), AO (with or without digital communication), DI, DO, and/or PI channels. The I/O terminals 410 include any suitable structures for coupling to different communication paths, such as screw terminals.

A power terminal 412 can be used to couple the RTU 102 to a power supply, such as the power supply 218. A slot 414 provides access to additional connectors, such as the expansion board 206 for coupling to the I/O modules 210a-210n.

Note that the numbers and types of ports and terminals shown in FIGS. 4A and 4B are for illustration only. The RTU 102 could include any suitable type(s) and number(s) of interfaces as needed or desired.

Although FIGS. 4A and 4B illustrate details of an example RTU 102, various changes may be made to FIGS. 4A and 4B. For example, the number(s) and type(s) of ports and interfaces shown in FIGS. 4A and 4B are for illustration only. Also, the functional divisions of the RTU 102 shown in FIGS. 4A and 4B are for illustration only. Various components in FIGS. 4A and 4B could be omitted, combined, or further subdivided and additional components could be added according to particular needs.

FIGS. 5A through 5D illustrate an example method 500 for operating a secure digital card based RTU according to this disclosure. For ease of explanation, the method 500 is described with respect to the RTUs 102 and control system 104 shown in FIGS. 1 through 4B. However, the method 500 could be used by any suitable RTU and in any suitable system. The method 500 includes blocks 502-532, and incorporates processes 540, 550 and 560.

In block 502, the method 500 begins. As an example, the RTU 102 can power on. In block 504, the RTU 102 determines whether an SD card 645 is coupled to processing circuitry of the RTU 102. For example, the RTU 102 determines whether a SD card 645 is plugged into the SD card slot 240. When no SD card is plugged in, the method 500 remains at block 502. The method 500 proceeds to block 506 when the RTU 102 detects that an SD card 645 is coupled (e.g., connected) to the processing circuitry of the RTU 102.

In block 506, the RTU 102 determines whether the SD card 645 is authorized. That is, the RTU 102 determines whether the processing circuitry of the RTU is authorized to access the information the stored on the SD card 645. In certain embodiments, the RTU 102 will refrain from accessing information that is stored on the SD card 645 until the RTU determines that the SD card 645 is authorized. The "NO" arrow 508 represents such refraining by leading to the end block 532.

In block 506, the RTU 102 can use any suitable method of performing authorization. An example authorization method includes using a pair of keys, namely, a public key stored in the RTU (such as in on-chip memory) and a private key corresponding to the public key. The private key can be stored in the SD card 645. When the SD card 645 is inserted into the SD card slot 240, the RTU 102 checks whether a specified file is available in the SD card 645. When the specified file is available on the SD card 645, the RTU 102 uses its public key to calculate the file data, and then compares the file data (e.g., calculation result of the RTU) with the calculation result stored in the SD card 645. If both calculation result values are the same, the SD card 645 is considered to be authorized. Otherwise, if the RTU calculation result does not match the SD card calculation result in the specified file, the SD card 645 is considered to be unauthorized. In certain embodiments, the RTU 102 does not require the SD card 645 to be authorized, in which case, implementation of block 506 is optional. In other embodiments, the owner of the RTU 102 seeks to protect its system operations from security threats by requiring the RTU 102 to make a determination that the SD card 645 is authorized prior to performing any other functions using the information stored on the SD card 645.

In block 510, the RTU 102 determines whether the SD card 645 stores specified function code. The RTU 102 is configured to access a specified folder in the SD card 645 and perform a specified function by executing the specified function code. When the SD card 645 stores the function code in the specified file, accordingly, the function code can be referred to as the specified function code. The SD card 645 can store multiple specified function codes in the specified file. The RTU 102 reads the function code(s) and takes the corresponding action(s). In certain embodiments, the RTU 102 will not execute functions stored in folders other than the specified folder that the RTU 102 is configured to access, in which case the "NO" arrow 512 represents the RTU refraining from executing functions stored in other non-specified folders.

As shown by blocks 514, 516, 518, 520, and 522, the RTU 102 performs a specified function by executing the specified function code. The specified functions can be categorized as a download type function (blocks 514 and 522), an upload type function (blocks 518 and 520), a reset type function (block 516), or an extended storage type function. FIG. 5B illustrates a process 540 of performing a download type function when the specified function belongs to the download type function category. FIG. 5C illustrates a process 550 of performing an upload type function when the specified function belongs to the upload type function category. FIG. 5D illustrates a process 560 of performing reset type function when the specified function belongs to the reset type function category. Accordingly, performing the specified function in each of blocks 514 and 522 includes performing a download process 540. Analogously, performing the specified function in block 516 includes performing a reset process 560, and performing the specified function in either of blocks 518 and 520 includes performing an upload process 550.

In block 514, the RTU 102 performs a prepared project download. That is, the SD card 645 includes a specified folder that stores function code corresponding to causing the RTU 102 to perform a prepared project download function. Block 514 includes implementing the process 540 of performing a download type function (described below with reference to FIG. 5B), wherein the new configuration information comprises a new prepared project, and wherein the existing configuration information comprises an existing prepared project.

In block 516, the RTU 102 performs a factory reset. That is, the RTU 102 clears the on-chip memory of existing prepared projects by deleting each existing prepared project. Block 516 includes implementing the process 560 of performing reset type function (described below with reference to FIG. 5D).

In block 518, the RTU 102 performs an RTU system event logs export. That is, the RTU on-chip memory stores existing information, namely system event logs. Block 518 includes implementing the process 550 of performing an upload type function (described below with reference to FIG. 5C).

In block 520, the RTU 102 performs a prepared project export. That is, the RTU 102 on-chip memory stores existing information, namely RTU system event logs. Block 520 includes implementing the process 550 of performing an upload type function (described below with reference to FIG. 5C).

In block 522, the RTU 102 performs a firmware upgrade. Block 522 includes implementing the process 540 of performing a download type function (described below with reference to FIG. 5B), wherein the new configuration information includes a new RTU firmware image, and the existing configuration information includes existing firmware.

In block 524, the RTU 102 determines whether its processing circuitry has completed execution of the specified function code. If not, the RTU 102 continues to perform the specified function by executing the specified function code until completion. Upon completion performing the specified function, the RTU 102 activates a visual indicator, informing the user that the SD card 645 can be removed from the RTU 102 without damage (block 526). For example, the RTU 102 blinks an LED light for approximately 10 seconds, and then turns the LED light off. Premature removal of the SD card 645, such as during execution of code stored on the SD card 645, can damage the SD card 645 or the processing circuitry of the RTU 102.

In block 530, the RTU 102 determines whether the SD card 645 is decoupled from the processing circuitry of the RTU 102. For example, the RTU 102 determines whether a SD card 645 is unplugged out of the SD card slot 240. While the SD card remains plugged in, the method 500 remains at block 530. The method 500 proceeds to block 532 and ends when the RTU 102 detects that an SD card 645 is disconnected from the processing circuitry of the RTU 102. In block 532, the method 500 ends; for example, the RTU 102 can be powered off or restarted. Any changes in configuration can be implemented upon a restart.

In FIG. 5B, the SD card 645 stores new configuration information, such as a new RTU firmware image or a new prepared project. That is, by executing the function code corresponding to the download type function, the RTU 102 is able to replace any existing configuration information stored in the on-chip memory by copying the new configuration information from the SD card 645 to the on-chip memory. In the event that no pre-existing configuration is stored in the on-chip memory, the new configuration is simply added to the on-chip memory without replacing. At the beginning of the process 540, RTU 102 initiates execution of the specified code.

In block 542, the RTU 102 indicates that its processing circuitry has initiated execution of specified function code, such as performing the download type function, but that the function is not complete. That is, the RTU 102 activates a visual indicator during execution of the function code and until execution of the function code is complete, thereby informing a user that removal of the PSM from the RTU may cause damage. For example, the RTU 102 blinks an LED light.

In block 544, the RTU 102 determines whether the new configuration information is compatible with the hardware of the RTU. For example, in order to determine compatibility, the RTU 102 can compare identification information of the new configuration information with a compatibility indicator stored in the RTU. As the RTU 102 is configured to refrain from storing incompatible configuration information, the process 540 ends and the method 500 proceeds to block 532 in response to a determination that the new configuration information is incompatible with the RTU hardware.

In block 546, the RTU 102 copies the new configuration information from the SD card to the on-chip memory of the RTU 102. In block 548, the RTU 102 selects to replace any existing configuration information stored in the on-chip memory by deleting the existing configuration information. For example, the RTU 102 can write the new configuration information over the existing configuration information. Next, the process 540 ends and the method 500 proceeds to block 524.

In FIG. 5C, the on-chip memory stores existing information. In the process 550 of performing an upload type function, the RTU 102 indicates that the upload type function is not complete (block 542). The details of block 542 are described above with reference to FIG. 5B. In block 552, the RTU 102 copies the existing information from the on-chip memory to the SD card. Next, the process 550 ends and the method 500 proceeds to block 524.

In FIG. 5D, at the beginning of the process 560 of performing reset type function, the RTU 102 indicates that the reset type function is not complete (block 542). The details of block 542 are described above with reference to FIG. 5B. In block 562, the RTU 102 deletes each existing prepared project from its on-chip memory. Next, the process 560 ends and the method 500 proceeds to block 524.

Although FIGS. 5A-5D illustrate one example of a method 500 for operating a secure digital card based RTU, various changes may be made to FIGS. 5A-5D. For example, while shown as a series of steps, various steps shown in FIGS. 5A-5D could overlap, occur in parallel, or occur multiple times. Moreover, some steps could be combined or removed and additional steps could be added.

FIG. 6 illustrates a PSM 645 according to this disclosure. For ease of explanation, the PSM 645 is referred to as SD card 645. The embodiment of the PSM 645 shown in FIG. 6 is for illustration only. Other embodiments could be used without departing from the scope of the present disclosure.

The SD card 645 is a flash memory module in the form of a small square or slightly oblong flat card with connector electrodes along one side that mate with corresponding connectors within the SD card slot 240. The SD card 645 contains a private key 650 and a specified file 655. The specified file 655 contains data, and a calculation result based on the data and private key. The calculation result is compared with a corresponding calculation at a predetermined memory location in an on-chip storage device within the RTU 102 to authorize the SD card 645. Once authorized, the RTU 102 permits the controller module(s) 202a-202b to access the specified file 655 and to automatically execute instructions or function codes in the specified file 655. The authorization can take place automatically as a response to insertion of the SD card 645, but removal of the card causes reauthorization upon subsequent insertion. In certain embodiments, the SC card 645 can contain multiple function codes in predetermined memory locations on the card, each corresponding to a different specified function (described more particularly above with reference to blocks 514-522 of FIG. 5A). In such embodiments, a single SD card 645 can cause the RTU 102 to perform multiple specified functions. Further, the function code stored SD card 645 can include: (i) a program for storing historical data on the SD card; (ii) a new firmware image for performing a firmware upgrade; (iii) a prepared project configuration to be downloaded to the on-chip memory within the RTU 102; (iv) a program for uploading a project configuration that is already stored in the on-chip memory to the SD card; (v) a factory reset program for the on-chip memory of existing prepared projects; and (vi) a program for uploading system event logs from the on-chip memory to the SD card 645. These function codes enable a user to transfer information into a management data system for analysis and to configure or reconfigure the RTU 102 to increasingly automate the data transfer process.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
determining, by processing circuitry of a remote terminal unit (RTU), that a portable storage medium (PSM) is coupled to the processing circuitry;
refraining from accessing function code stored in a specified folder of the PSM at least until a determination is made that the processing circuitry is authorized to access information stored on the PSM, the determination based on a relationship between (i) a public key stored in an on-chip memory disposed on a same chip as the processing circuitry and (ii) a private key stored in the PSM; and
in response to determining that the processing circuitry is authorized to access the information stored on the PSM, performing a specified function corresponding to the function code by executing the function code;
wherein the RTU comprises a slot configured to physically receive the PSM and electrically couple the PSM to the processing circuitry.

2. The method of claim 1, wherein:
the specified function comprises a download;
the PSM stores new configuration information; and
performing the specified function comprises, in response to determining that the new configuration information is compatible with hardware of the RTU, replacing existing configuration information stored in the on-chip memory by copying the new configuration information from the PSM to the on-chip memory.

3. The method of claim 2, wherein:
the function code corresponds to a firmware upgrade;
the new configuration information comprises a new RTU firmware image; and
the existing configuration information comprises existing firmware.

4. The method of claim 2, wherein:
the function code corresponds to a prepared project download;
the new configuration information comprises a new prepared project; and
the existing configuration information comprises an existing prepared project.

5. The method of claim 1, wherein:
the specified function comprises an upload;
the on-chip memory stores existing infatuation; and
performing the specified function comprises copying the existing information from the on-chip memory to the PSM.

6. The method of claim 5, wherein:
the function code corresponds to a prepared project export; and
the existing information comprises an existing prepared project.

7. The method of claim 5, wherein:
the function code corresponds to an export of one or more system event logs; and
the existing information comprises the one or more system event logs.

8. The method of claim 1, wherein:
the specified function comprises a reset; and
performing the specified function comprises clearing the on-chip memory of one or more existing prepared projects by deleting each existing prepared project.

9. The method of claim 1, further comprising:
activating a visual indicator during execution of the function code and until execution of the function code is complete, the visual indicator informing a user that removal of the PSM from the RTU may cause damage; and
activating another visual indicator when execution of the function code is complete, the other visual indicator informing the user that the PSM can be removed from the RTU without damage.

10. A system comprising:
a remote terminal unit (RTU) that includes:
  processing circuitry,
  a portable storage interface configured to physically receive a portable storage medium (PSM) and electrically couple the PSM to the processing circuitry, and
  on-chip memory disposed on a same chip as the processing circuitry,
  wherein the processing circuitry is configured to:
    determine that the PSM is coupled to the processing circuitry;
    refrain from accessing function code stored in a specified folder of the PSM at least until a determination is made that the processing circuitry is authorized to access information stored on the PSM, the determination based on a relationship between (i) a public key stored in the on-chip memory and (ii) a private key stored in the PSM; and
    in response to determining that the processing circuitry is authorized to access the information stored on the PSM, perform a specified function corresponding to the function code by executing the function code.

11. The system of claim 10, wherein:
the specified function comprises a download;
the PSM stores new configuration information; and
the processing circuitry is configured to perform the specified function by, in response to determining that the new configuration information is compatible with hardware of the RTU, replacing existing configuration information stored in the on-chip memory by copying the new configuration information from the PSM to the on-chip memory.

12. The system of claim 11, wherein:
the function code corresponds to a firmware upgrade;
the new configuration information comprises a new RTU firmware image; and
the existing configuration information comprises existing firmware.

13. The system of claim 11, wherein:
the function code corresponds to a prepared project download;
the new configuration information comprises a new prepared project; and
the existing configuration information comprises an existing prepared project.

14. The system of claim 10, wherein:
the specified function comprises an upload;
the on-chip memory is configured to store existing information; and
the processing circuitry is configured to perform the specified function by copying the existing information from the on-chip memory to the PSM.

15. The system of claim 14, wherein:
the function code corresponds to a prepared project export; and
the existing information comprises an existing prepared project.

16. The system of claim 14, wherein:
the function code corresponds to an export of one or more system event logs; and
the existing information comprises the one or more system event logs.

17. The system of claim 10, wherein:
the specified function comprises a reset; and
the processing circuitry is configured to perform the specified function by clearing the on-chip memory of one or more existing prepared projects by deleting each existing prepared project.

18. The system of claim 10, wherein the PSM is a secure digital (SD) card configured to store information in non-volatile memory.

19. The method of claim 1, wherein determining that the PSM is coupled to the processing circuitry comprises:
determining that the PSM has been physically coupled to the slot of the RTU, the slot configured to removably receive the PSM.

20. A system comprising:
a remote terminal unit (RTU) that includes:
  one or more input/output terminals configured to be coupled to one or more industrial field devices in an industrial control and automation system;
  at least one processor configured to execute control logic and generate at least one control signal for at least one of the one or more industrial field devices;
  a portable storage interface configured to physically receive a portable storage medium (PSM) and electrically couple the PSM to the at least one processor, the portable storage interface configured to removably receive the PSM; and
  at least one memory coupled to the at least one processor;
wherein the at least one processor is configured to:
  determine that the PSM is coupled to the portable storage interface;
  access a specified folder of the PSM;
  determine that the PSM stores function code in the specified folder;
  refrain from accessing the function code in the specified folder at least until a determination is made that the at least one processor is authorized to access the function code, the determination based on a relationship between (i) a public key stored in the at least one memory and (ii) a private key stored in the PSM; and
  execute the function code in response to determining that the at least one processor is authorized to access the function code.

* * * * *